(12) United States Patent
Kim

(10) Patent No.: US 9,184,783 B2
(45) Date of Patent: Nov. 10, 2015

(54) DEVICE FOR SEPARATING SIGNAL TRANSMISSION AND RECEPTION AND COMMUNICATION SYSTEM INCLUDING SAME

(71) Applicant: Avago Technologies General IP (Singapore) Pte. Ltd., Singapore (SG)

(72) Inventor: Won Kyu Kim, Seoul (KR)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/534,234

(22) Filed: Nov. 6, 2014

(65) Prior Publication Data
US 2015/0065124 A1    Mar. 5, 2015

Related U.S. Application Data

(62) Division of application No. 13/237,128, filed on Sep. 20, 2011, now Pat. No. 8,908,668.

(51) Int. Cl.
*H04L 1/20* (2006.01)
*H04W 80/02* (2009.01)
*H04B 1/525* (2015.01)
*H04B 7/26* (2006.01)
*H04L 27/00* (2006.01)
*H04W 88/06* (2009.01)

(52) U.S. Cl.
CPC .............. *H04B 1/525* (2013.01); *H04B 7/2628* (2013.01); *H04L 27/0008* (2013.01); *H04W 88/06* (2013.01)

(58) Field of Classification Search
USPC ........................... 370/342, 365, 311; 455/126
See application file for complete search history.

(56) References Cited

U.S. PATENT DOCUMENTS

2008/0229178 A1\* 9/2008 Shimura ....................... 714/789
2012/0113874 A1\* 5/2012 Sanguinetti ................... 370/277

\* cited by examiner

*Primary Examiner* — Andrew Chriss
*Assistant Examiner* — John Lequang

(57) ABSTRACT

A communication system includes an antenna. A signal transmission and reception unit for cellular CDMA communication and a signal transmission and reception unit for PCS COMA communication are coupled to the antenna.

11 Claims, 11 Drawing Sheets

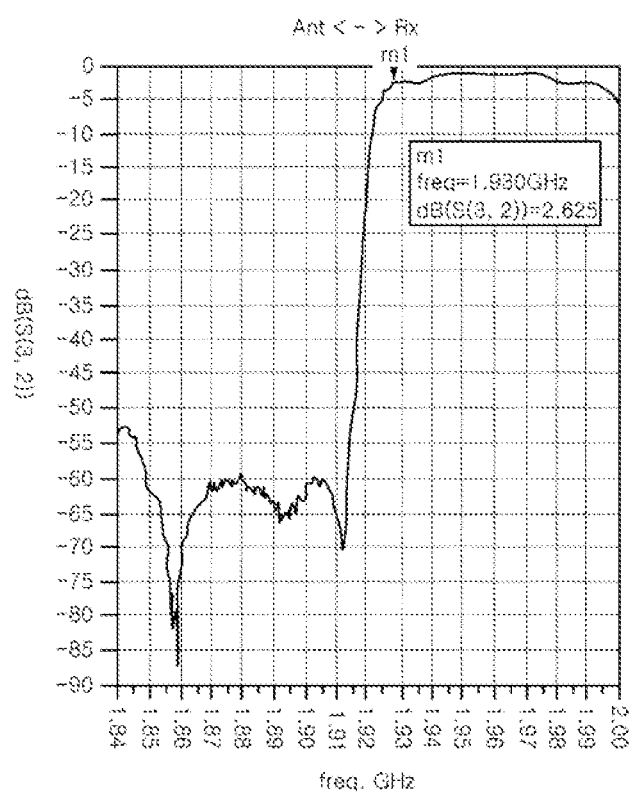

DEVICE FOR SEPARATING SIGNAL TRANSMISSION AND RECEPTION AND COMMUNICATION SYSTEM INCLUDING SAME

CROSS-REFERENCE TO RELATED APPLICATIONS

This application is also a divisional application under 37 C.F.R. 1.53(b) of U.S. patent application Ser. No. 13/237,128 filed on Sep. 20, 2011 the disclosure of which is specifically incorporated by reference in its entirety and for all purposes. Priority is claimed under 35 USC. §121 from U.S. patent application Ser. No. 13/237,128.

BACKGROUND

In a communication system, it is desirable to have a path for transmitting a signal and a path for receiving a signal separated from each other, so as to avoid or reduce interference between the transmission signal and the reception signal which may degrade the quality of communication.

On the other hand, when a communication system uses two or more antennae simultaneously, for example, when a communication system has two respective antennae for two different communication schemes, e.g., SVLTE (Simultaneous Voice and LIE), SVDO (Simultaneous Voice and EVDO), a signal transmitted via one antenna often may be received at another antenna and added to a reception signal of the other antenna, thereby degrading the quality of communication. An example of such interference is third-order intermodulation (IMD3) distortion.

Conventionally, an isolator and/or a ceramic notch filter (i.e., band stop filter), which can remove an interference in a certain frequency band, have been employed so as to reduce the interference between the transmission signal and the reception signal and/or the interference between different communication schemes. However, use of an isolator and/or a ceramic notch filter may result in an increase in the physical size and cost of the communication system, while failing to sufficiently reduce interference.

BRIEF DESCRIPTION OF THE DRAWINGS

The above and other objects and features of the present invention will become apparent from the following description of embodiments given in conjunction with the accompanying drawings, in which;

FIGS. 2B to 2D show simulation results of the circuit for separating signal transmission and reception according to the first embodiment;

DETAILED DESCRIPTION

Hereinafter, preferred embodiments of the present invention will be described in detail with reference to the accompanying drawings. However, the embodiments are only exemplary and the present invention is not limited thereto.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising." when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

It will be understood that when an element or component is referred to as being "connected to", "coupled to", or "adjacent to" another element or component, it can be directly connected or coupled to the other element or component, or intervening elements or components may be present. In contrast, when an element is referred to as being "directly connected to" or "directly coupled to" another element or component, there are no intervening elements or components present.

The present teachings relate generally to a device for separating signal transmission and reception, capable of handling two or more different signals simultaneously with two or more antennas, and, specifically, to a device for separating signal transmission and reception which reduces signal distortion by isolating transmission and reception thereof effectively.

Figure 1:
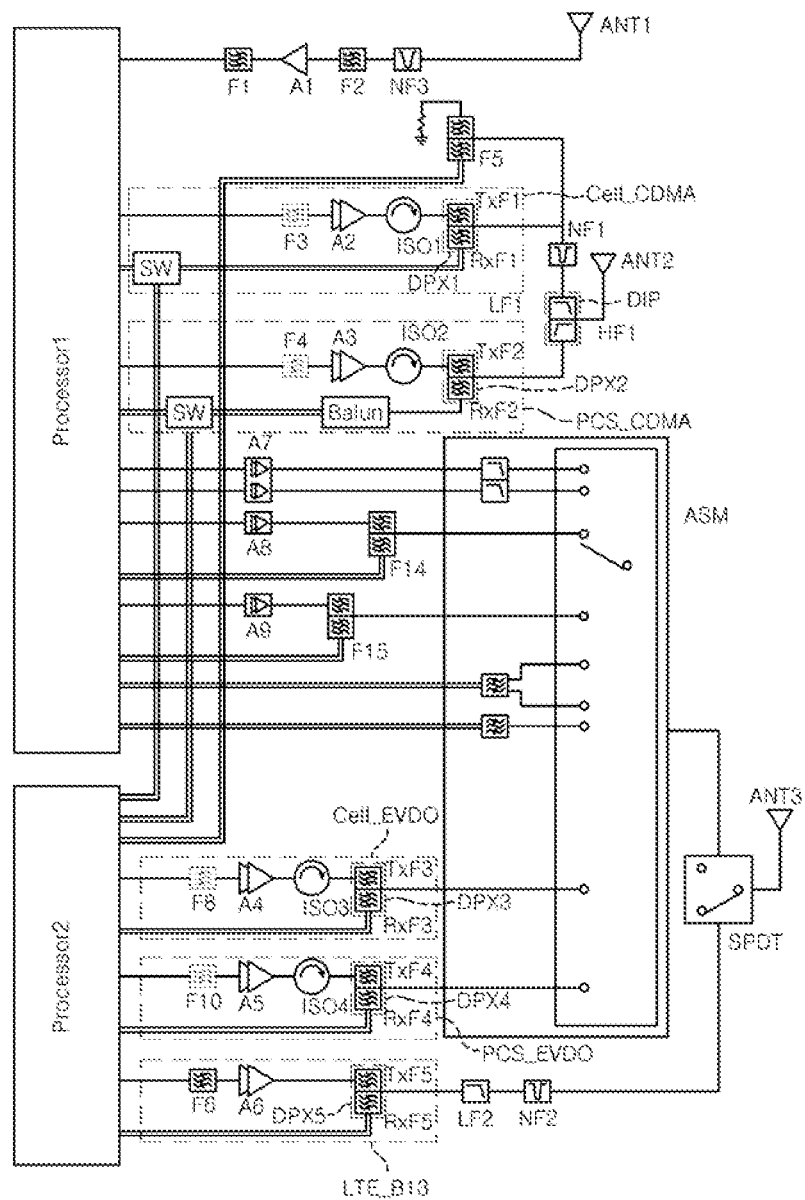
FIG. 1 illustrates a communication system.

FIG. 1 illustrates a communication system 1000. Communication system 1000 has two processors, i.e., a processor 1 and a processor 2, which can perform communication simultaneously in different communication schemes. Processor 1 may support voice communication based on a variety of standards or protocols, e.g. WCDMA (Wideband Code Division Multiple Access), GSM (Global System for Mobile communication) and/or CDMA (Code Division Multiple Access), Processor 2 may support data communication based on a variety of standards or protocols, e.g., EVDO (Evolution-Data Only) and/or LTE (Long Term Evolution). Further, processor 2 may utilize a diversity of communication, including both voice communication, such as CDMA, and data communication, such as LTE or EVDO.

In one exemplary embodiment, communication system 1000 carries out cellular CDMA communication and PCS (Personal Communication Service) CDMA communication via an antenna ANT2. Antenna ANT2 is coupled to cellular CDMA signal transmission and reception unit Cell_CDMA via lowpass filter 1, F1 in a diplexer DIP, and to PCS CDMA signal transmission and reception unit PCS_CDMA via highpass filter HF1 in diplexer DIP, in the cellular CDMA signal transmission and reception unit Cell_CDMA, a signal to be transmitted which was output from processor 1, passes through a bandpass filter F3 and is amplified by amplifier A2 before being forwarded to antenna ANT2 via transmission filter TxF1 in a duplexer DPX1 and outputted from antenna ANT2. On the other hand, a signal received via antenna ANT2 is forwarded to processor 1 through a reception filter RxF1 in duplexer DPX1. To support voice communication and data communication being carried out simultaneously, as in the case of SVDO (Simultaneous Voice and EVDO), an isolator ISO1 is disposed on a transmitting side of the cellular CDMA signal transmission and reception unit Cell_CDMA so as to protect the linearity of amplifier A2 from degradation due to interference from a data signal transmitted according to EVDO, Isolator ISO1 only allows a signal to flow in a direction from amplifier A2 to transmission filter TxF1 while blocking signal flow in a reverse direction from transmission filter TxF1 to amplifier A2. Thus, the signal propagation from antenna ANT2 in the reverse direction toward amplifier A2 can be blocked. In addition, in order to suppress interference induced by one or more signals in other frequency band(s), for example, a signal from an antenna ANT3, a notch circuit NF1 may be provided, in a signal path between bandpass filter LF1 and duplexer DPX1.

Similarly, for a PCS CDMA signal, a signal to be transmitted is forwarded to antenna ANT2 through a bandpass filter F4, an amplifier A3 and a transmission filter TxF2 in duplexer DPX2 while the received signal is provided to processor 1 via a reception filter RxF2 in duplexer DPX2. On the transmitting side of the PCS CMDA signal transmission and reception unit PCS_CDMA, an isolator ISO2 is provided to protect the linearity of amplifier A3. If an LTE B13 signal is communicated by antenna ANT3 a notch circuit may not be provided in the signal path for the PCS CMDA communication because the PCS CDMA signal is less affected by the LTE B13 signal. On the receiving side of the PCS CDMA signal transmission and reception unit PCS_CDMA, a Balun (balance to unbalance transformer) may be provided to transform a balanced signal into an unbalanced signal. Alternatively, a duplexer with a balanced receiving port may be employed.

Processor 2 may support data communication according to EVDO or LTE standards or protocols. In order for processor 2 to support cellular EVDO with antenna ANT3, a filter F8, an amplifier A4 and a transmission filter TxF3 of a duplexer DPX3 are provided on a transmitting side of a cellular EVDO signal transmission and reception unit Cell_EVDO, and a reception filter RxF3 of duplexer DPX3 is provided on a receiving side of cellular EVDO signal transmission and reception unit Cell_EVDO. An isolator ISO3 may be provided, on the transmitting side of the cellular EVDO signal transmission and reception unit Cell_EVDO in order to protect the linearity of amplifier A4. In order to support PCS EVDO communication, a filter F10, an amplifier A5 and a transmission filter TxF4 of a duplexer DPX4 are provided on a transmitting side of a PCS EVDO signal transmission and reception unit PCS_EVDO, and a reception filter RxF4 of duplexer DPX4 is provided on a receiving side thereof. Also an isolator ISO4 is provided, on the transmitting side of PCS EVDO signal transmission and reception unit PCS_EVDO.

Additionally, in order for processor 2 to support LTE B13 communication, a bandpass filter F6, an amplifier A6 and a transmission filter TxF5 of a duplexer DPX5 are provided on a transmitting side of a LTE B13 transmission and reception unit LTE_B13, and a reception filter RxF5 of duplexer DPX5 is provided on a receiving side of LTE B13 transmission and reception unit LTE_B13. Further, a lowpass filter LF2 is provided in a signal path between duplexer DPX5 and antenna ANT3 to prevent a quality of a received GPS signal from being degraded by interference caused by 2nd order harmonics of LTE B13 transmission. Because antenna ANT3 is commonly utilized for EVDO, LTE and CDMA communications, $3^{rd}$ order intermodulation (IMD3) may be caused by an LTE B13 transmission signal, and a cellular CDMA transmission signal received through antenna ANT2. Accordingly, a switch SPOT which has a highly linear characteristic may determine a signal path as necessary so that IMD3 is prevented. A notch filter NF2 may be provided so that LTE B13 is not affected by the communication via antenna ANT2.

An antenna ANT1 is for obtaining locational information, e.g., an antenna for receiving a GNSS (Global Navigation Satellite System) or Global Positioning System (GPS signal. For this purpose, a reception filter F2, a filter F1 and a low noise amplifier A1 may be provided. Additionally, a notch filter NF3 for the LTE B13 transmission signal may be provided to prevent interference by a signal from antenna ANT3.

As illustrated in FIG. 1, communication system 1000 also includes an amplifier switch module (ASM), and switches (SW) for routing received CDMA signals to processor and processor 2.

In communication system 1000, a ceramic notch filter is usually employed as the notch filter, which is relatively large and, if incorporated into a circuit, results in a large circuit area. The ceramic notch filter typically has a length of about 10.3 mm, which is 4 to 5 times larger than other circuit components in a communication system. Accordingly, the ceramic notch filter is a major reason for an enlarged circuit area. Further, the height of the ceramic notch filter, i.e., about 2 mm, is one of the main obstacles to manufacturing a thin or slim handset.

Figure 2A:
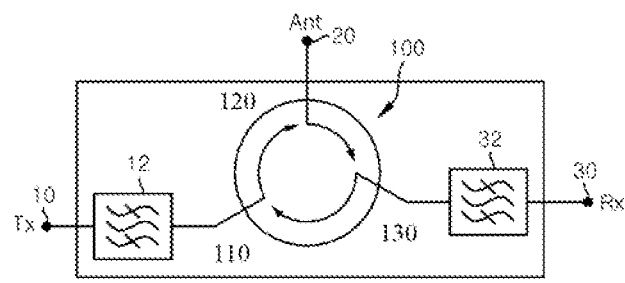
FIG. 2A depicts to device for separating signal transmission and reception according to a first embodiment.

FIG. 2A illustrates a device 200 for separating signal transmission and reception according to a first embodiment.

Referring to FIG. 2A, device 200 includes a first device port 10, a second device port 20 and a third device port 30. Device 200 also includes a circulator 100 having a first circulator port 110, a second circulator port 120, and a third circulator port 130. An input signal provided to first device port 10 may be output at second device port 20 and substantially not output (or output at a substantially attenuated level) at third device port 30, and an input signal provided to second device port 20 may be output at third device port 30. A transmission filter 12 may be coupled between first circulator port 110 and first device port 10, and a reception filter 32 may be coupled between third circulator port 130 and third device port 30. As transmission filter 12 and/or reception filter 32, a Film Bulk Acoustic Resonator (FBAR) filter and/or a Surface Acoustic Wave (SAW) filter may be employed.

In some embodiments (e.g., FIG. 5 described below): a transmission circuit is coupled or connected (e.g., directly coupled or connected) to first device port 10; an antenna is coupled or connected (e.g., directly coupled or connected) to second device port 20; and a reception circuit is coupled or connected (e.g., directly coupled or connected) to third device port 30. When a transmission circuit and an antenna are coupled to first device port 10 and second device port 20, respectively, a transmission signal provided to first device port 10 may be output to the antenna via second device port 20, but is not output at third device port 30. Since a signal received from the antenna, which is coupled to second device port 20 can be output at third device port 30, a reception circuit coupled to third device port 30 may receive a signal from the antenna. Therefore, isolation between the reception circuit and the transmission circuit can be obtained, and thereby additional isolation may be provided.

Figure 2B:
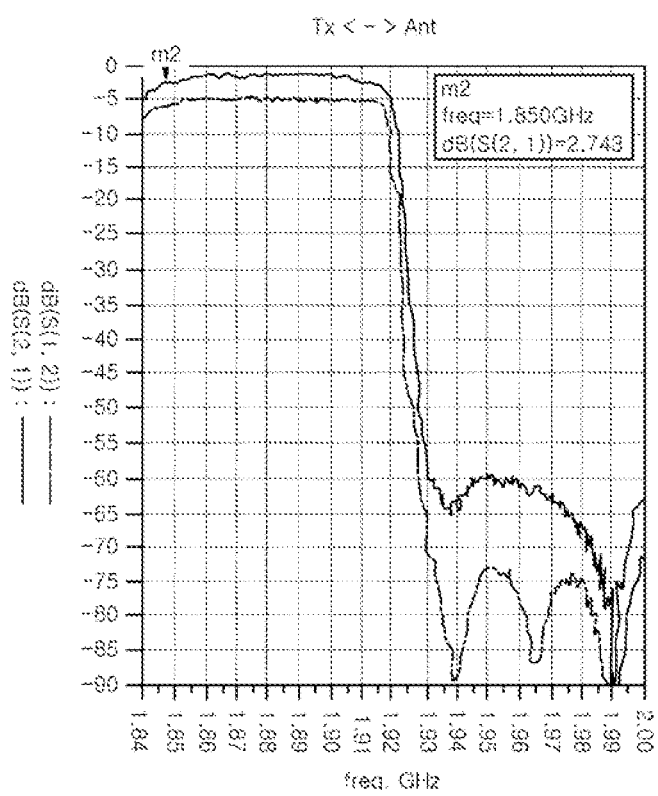
Figure 2D:
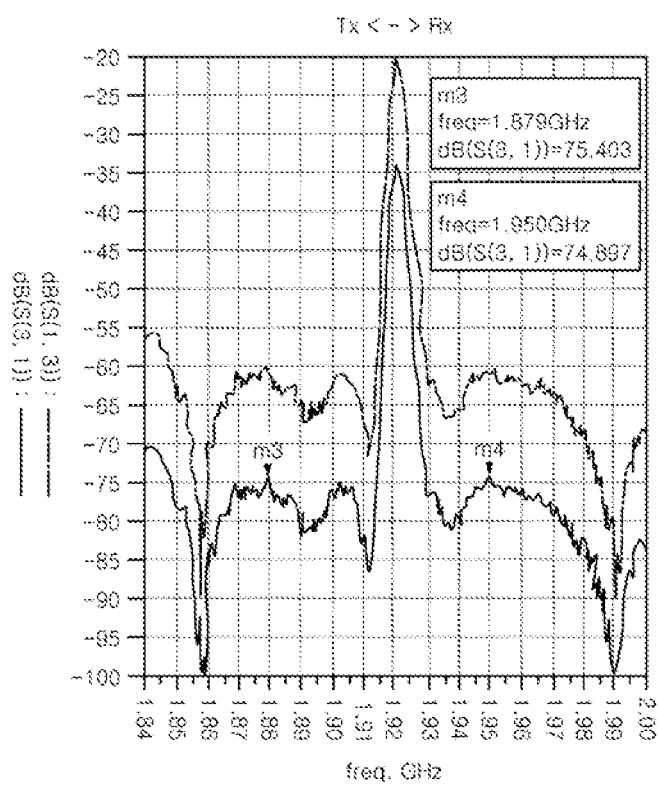

FIGS. 28 to 2D show simulation results of the circuit for separating signal transmission and reception shown in FIG. 2A. For the simulation, a circulator with 15 dB of isolation was used. FIG. 28 shows signal transfer characteristics in both directions between the first (TX) device port 10 and second (ANT) device port 20 for device 200. FIG. 2C shows a signal transfer characteristic from the second (ANT) device port 20 to the third (RX) device port 30 for device 200. And FIG. 2D shows signal transfer characteristics in both directions between the first (TX) device port 10 and third (RX) device port 20 for device 200. As shown in FIG. 2D, according to the circuit of FIG. 2A, 15 dB off isolation could be obtained between the reception circuit and the transmission circuit. However, referring to FIG. 2B, isolation in a reverse direction between the antenna (i.e., second device port 20) and the transmission circuit (i.e., first device port 10) might be insufficient.

Figure 3A:
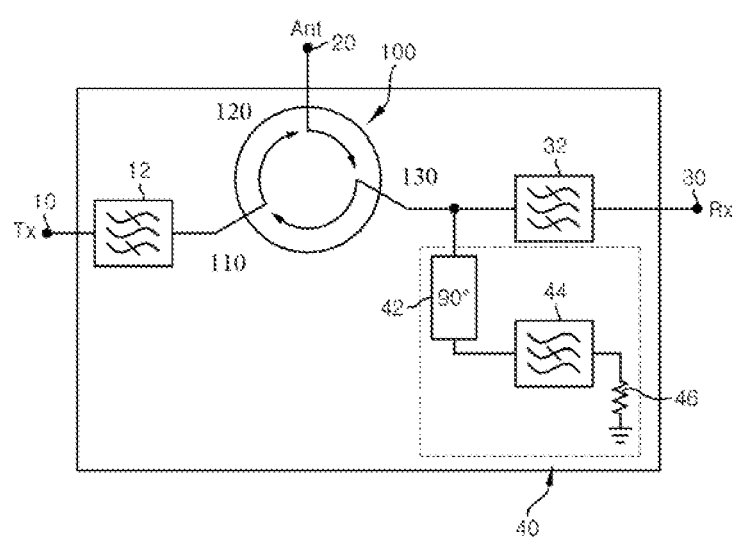
FIG. 3A presents a device for separating signal transmission and reception according to a second embodiment.

FIG. 3A illustrates a device 300 for separating signal transmission and reception according to a second embodiment.

Referring to FIG. 3A, device 300 is identical to device 200 of FIG. 2A except for a transmission termination unit 40 added thereto. Transmission termination unit 40 is provided for increasing isolation in the reverse direction and is connected off a signal path between third port 130 of circulator 100 and reception filter 32. Transmission termination unit 40 includes a ¼ wavelength (i.e., 90°) phase shifting unit 42 and a transmission filter 44. A termination resistor 46 may be added to transmission filter 44 in transmission termination unit 40. By providing transmission termination unit 40, a proper termination for first device port 10 can be provided when seen from second device port 20, thereby allowing substantially the same isolation for the reverse direction between the transmission circuit and the antenna (i.e., from second device port 20 to first device port 10) as isolation between the reception circuit and the transmission circuit. That is, in device 300, an input signal provided to first device port 10 of device 300 may be output at second device port 20 and substantially not output (or output at a substantially attenuated level) at third device port 30, and an input signal provided to second device port 20 of device 300 may be output at third device port 30 of device 300 and not output (or output at a substantially attenuated level) at first device port 10.

Figure 3B:
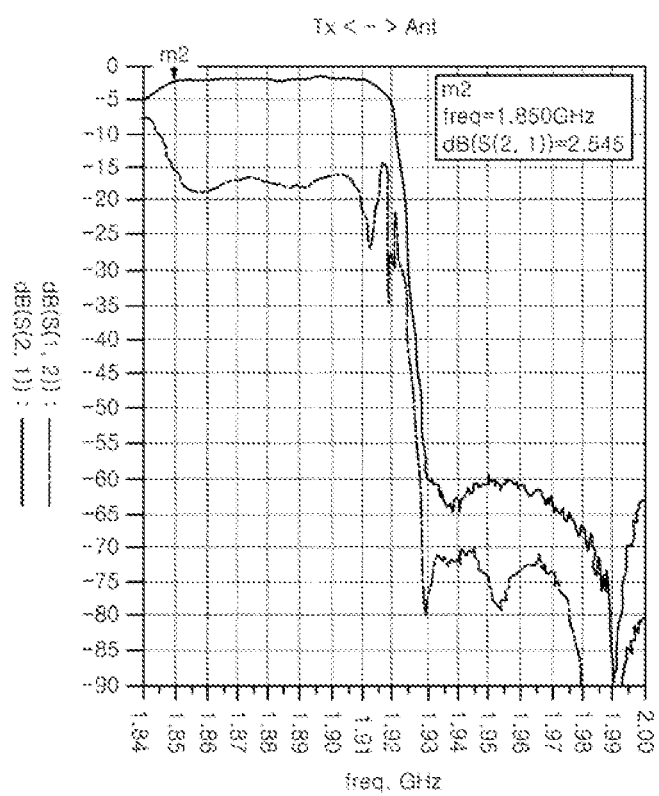
FIGS. 3B to 3D offer simulation results of the circuit for separating signal transmission and reception according to the second embodiment.
Figure 3C:
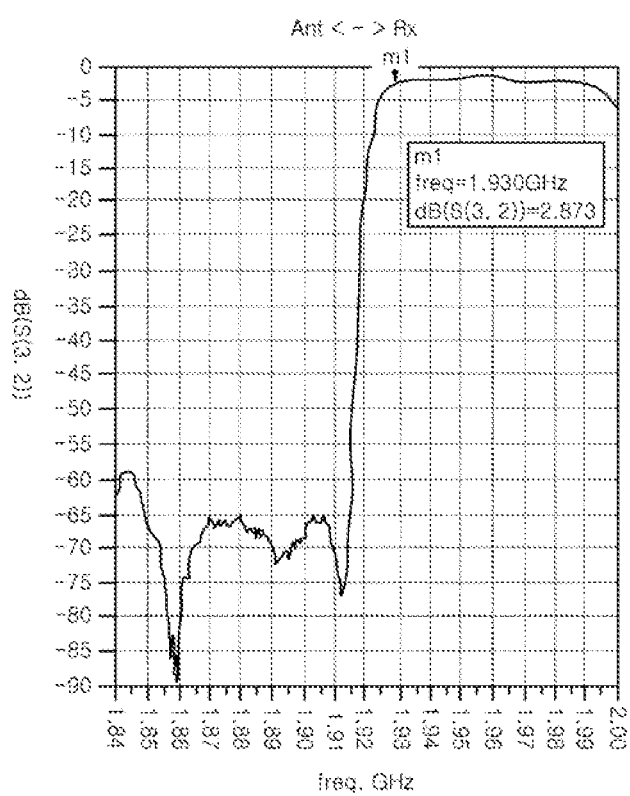
Figure 3D:
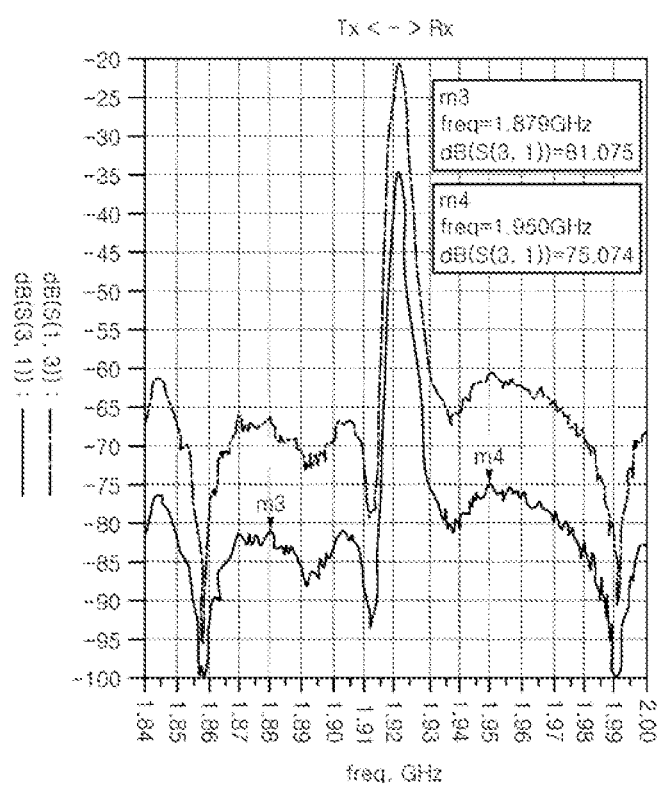

FIGS. 3B to 3D show simulation results device 300 of FIG. 3A. Again, to circulator with −15 dB isolation was used for the simulation. FIG. 3B shows signal transfer characteristics in both directions between the first (TX) device port 10 and second (ANT) device port 20 for device 300. FIG. 3C shows a signal transfer characteristic from the second (ANT) device port 20 to the third (RX) device port 30 for device 200. And FIG. 3D shows signal transfer characteristics in both directions between the first (TX) device port 10 and third (RX) device port 20 for device 300. As shown in FIGS. 3B and 3D, according to the circuit of FIG. 3A, 15 dB of isolation could be obtained in the reverse direction between the antenna and the transmission circuit (i.e., from second device port 20 to first device port 10) as well as between the reception circuit and the transmission circuit.

Figure 4:
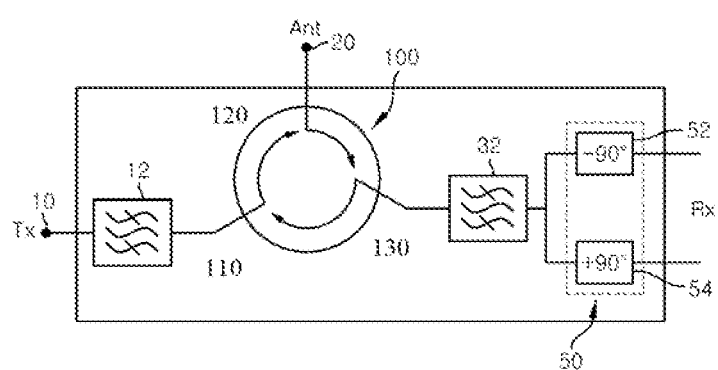
FIG. 4 exemplifies a device for separating signal transmission and reception accordion to a third embodiment.

FIG. 4 illustrates a device 400 for separating signal transmission and reception according to a third embodiment, in particular an embodiment in case a differential signal should be forwarded to the reception circuit. In this embodiment, a −90° phase shifting unit 52 and a +90° phase shifting unit 54 are included in a differential output unit 50, whereby a differential signal could be output to the reception circuit.

In one embodiment, circulator 100 and filters 12 and 32 shown in FIG. 2A, circulator 100, filters 12 and 32 and transmission termination unit 40 shown in FIG. 3a, and/or circulator 100, filters 12 and 32 and differential output unit 50 shown in FIG. 4 can be implemented as integrated circuit and provided as a single chip or module.

Figure 5:
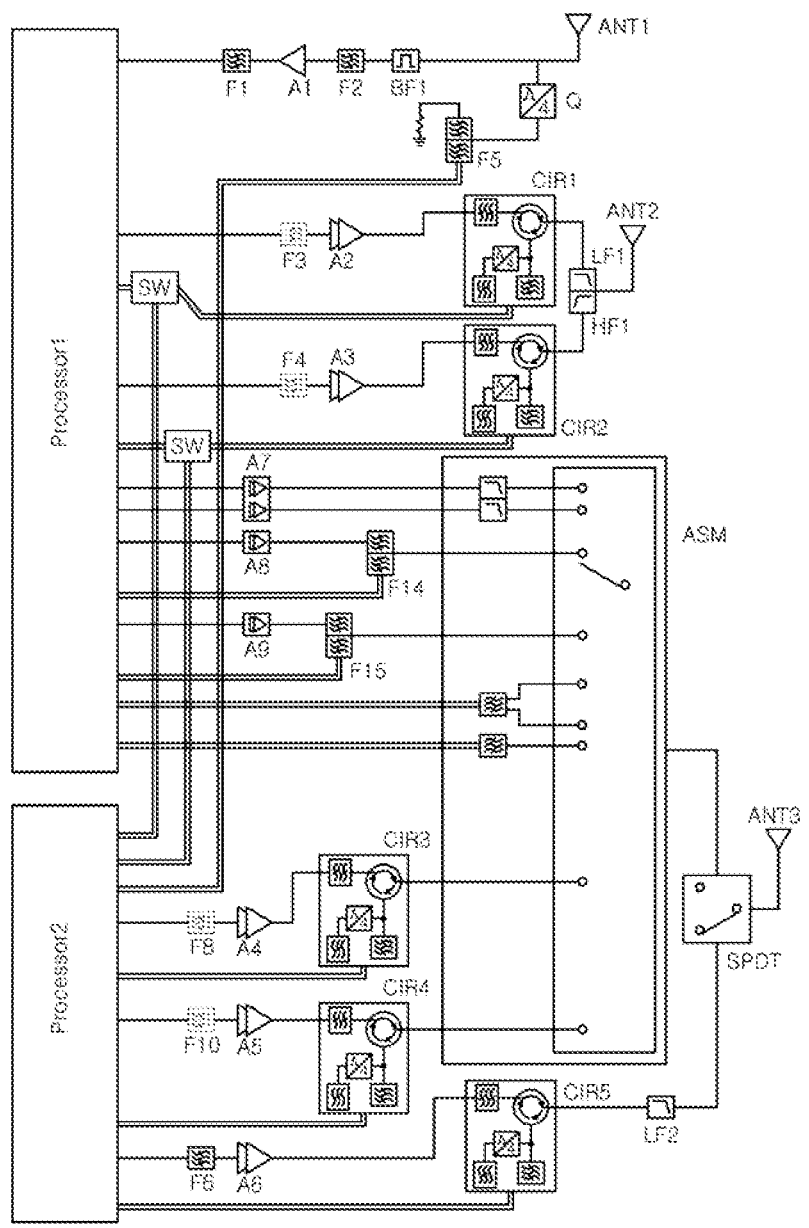
FIG. 5 provides an improved communication system utilizing the circuit for separating signal transmission and reception according to the second embodiment.

FIG. 5 illustrates a communication system 5000 utilizing the device 300 for separating signal transmission and reception according to the second embodiment. In communication system 500, circuits CIR1 and CIR2 for separating signal transmission and reception, each of which may be a device 300 as shown in FIG. 3A, are disposed adjacent to lowpass filter LF1 and highpass filter HF1 of a diplexer DIP, respectively, while isolators ISO1 and ISO2 and notch filter NF1 as shown in FIG. 1 have been removed. The circuits CIR1 and CIR2 may also be realized by employing the device 200 or the device 400 for separating signal transmission and reception as shown in FIGS. 2A and 4, respectively. First of all, circuit CIR1 for separating signal transmission and reception can reduce the interference caused by a signal that is simultaneously transmitted by the antenna ANT3. That is, in one embodiment, circuit CIR1 for separating signal transmission and reception can reduce the adverse effect on a signal according to the CDMA communication scheme by the signal from antenna ANT3 according to the LTE communication scheme.

Specifically, in the case of communication system 1000 of FIG. 1 employing notch filter NF1, IMD3 with respect to a reception of cellular CDMA signal can be calculated as according to Equation 1.

$$IMD3(CellRx) \approx 2 \times CellTx + 1 \times B13Tx - 2 \times IP3 \quad \text{[Equation 1]}$$
$$\approx 2 \times (27 \text{ dBm}) + (23 \text{ dBm} - 10 \text{ dB} - 20 \text{ dB}) -$$
$$2 \times (78.5 \text{ dBm})$$
$$\approx -110 \text{ dBm}$$

In Equation 1: CellTx denotes a power level of a transmission signal for cellular CDMA; B13Tx denotes a power level of a transmission signal for LTE B13 transmitted signal at antenna ANT3) as translated to the CDMA receiver; IP3 denotes a third order intercept point; CellTx is assumed to be 27 dBm; and IP3 for duplexer DPX1 is assumed to be 78.5 dBm. The power level of a transmission signal for LTE B13 is assumed to be 23 dBm. However, because this signal is subject to isolation (assumed to be 10 dB) between antenna ANT2 and antenna ANT3 and rejection of 20 dB by notch filter NF1, the corresponding term B13Tx is calculated as (23 dBm−10 dB−20 dB).

Meanwhile, in FIG. 5, IMD3 for a transmission filter of circuit CIR1 may be calculated as according to Equation 2.

$$IMD3(CellRx) \approx 2 \times CellTx + 1 \times B13Tx - 2 \times IP3 - CIRC \quad \text{[Equation 2]}$$
$$\approx 2 \times (27 \text{ dBm}) + (23 \text{ dBm} - 10 \text{ dB} - 15 \text{ dB}) -$$
$$2 \times (78.5 \text{ dBm}) - 15 \text{ dB}$$
$$\approx -120 \text{ dBm}$$

In Equation 2, 15 dB of isolation is provided in the reverse direction by a circulator of the circuit CIR1 is applied to the calculation of B13Tx, instead of the 20 dB of rejection by the notch filter of communication system 1000. Further, by the addition of the circulator, 15 dB of isolation between a reception port and a transmission port of circuit CIR1 is also applied in the last term CIRC of Equation 2. Accordingly, it is confirmed that the IMD3 is reduced compared to the case where the notch circuit is employed.

For a reception filter of circuit CIR1 of communication system 5000, IMD3 is calculated as according to Equation 3.

$$IMD3(CellRx) \approx 2 \times CellTx - CIRC + 1 \times B13Tx - 2 \times IP3 \quad \text{[Equation 3]}$$
$$\approx 2 \times (27 \text{ dBm} - 15 \text{ dB}) + (23 \text{ dBm} - 10 \text{ dB}) -$$
$$2 \times (78.5 \text{ dBm})$$
$$\approx -120 \text{ dBm}$$

In Equation 3, 15 dB of isolation between the reception port and the transmission port is subtracted from CellTx. Also in this case, it is confirmed that a reduced IMD3 is obtained compared to the case of communication system 1000 where a notch filter is used.

Analyzing the quantitative results expressed by the above equations in a qualitative manner, the device for separating signal transmission and reception according to various embodiments described above may provide isolation between the reception port and the transmission port as well as between an antenna port and the transmission port in the reverse direction. Therefore, an interference signal received via the antenna undergoes isolation before passing to the transmission side. Besides, an interference signal occurring from the transmission side is also subject to isolation before being provided to the reception side.

Further, the advantageous effect as described above referring to equations 1 to 3 may be achieved by replacing notch filter NF2 of communication system 1000 with circuit CIR5 as shown in FIG. 5. That is, circuit CIR5 can prevent a signal from antenna ANT2 from adversely affecting a communication received via antenna ANT3, and reduce IMD3. In addition, circuits CIR3 and CIR4 provide isolation between transmission and reception, which reduces IMD3. Accordingly, degradation of reception quality can be avoided, for example, in SVDO communication, which may have occurred in communication system 1000 employing the ceramic notch filter as shown in FIG. 1, by eliminating a nonlinearity caused by simultaneous reception of an EVDO data signal and a CDMA 1× voice signal in the same frequency band.

The above advantageous effect can be similarly obtained without replacing a notch filter with the device for separating signal transmission and reception. Specifically, if isolation circuits including the isolator of communication system 1000 are replaced by circuits CIR1 to CIR5, circuits CIR1 to CIR5 result in better isolation and lower IMD3 because they provide isolation between the transmission port and the reception port in addition to isolation between the antenna port and the reception port.

In addition to the improvement in communication quality as described above, according to one embodiment, seven components coupled to antenna ANT2 in communication system 1000, i.e., isolators ISO1 and ISO2, transmission filters TxF1 and TxF2, reception filters RxF1 and RxF2 of duplexer and notch filter NF1, can be replaced with only two components, i.e., circuits CIR1 and CIR2, as is apparent from comparison of FIGS. 1 and 5. This reduction of the number of components may result in a reduction of device size and manufacturing cost.

Figure 6A:
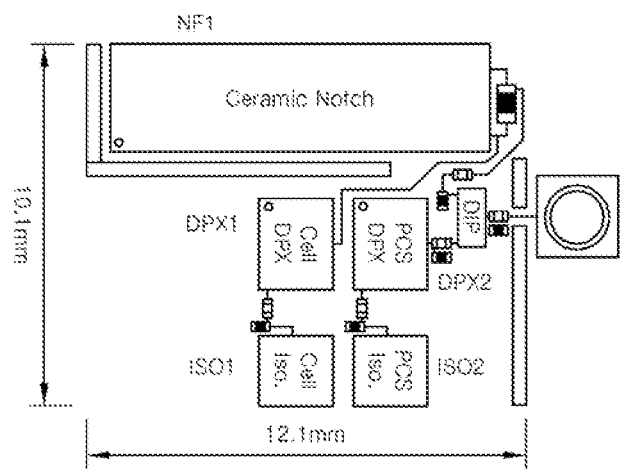
FIGS. 6A and 6B describe a reduction in circuit size achieved according to the second embodiment.
Figure 6B:
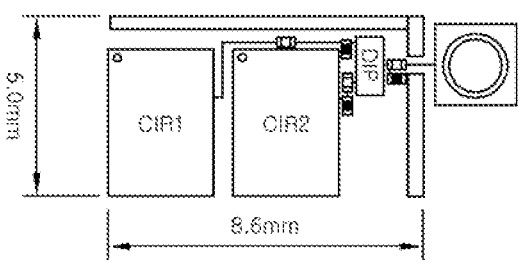

Especially, when a ceramic filter is used as the notch filter, the reduction of device size may be more significant. Referring to FIGS. 6A and 6B, while a circuit shown in FIG. 6A consisting of the seven components mentioned above has a size of 10.1 mm×12.1 mm, the circuit employing circuits CIR1 and CIR2 shown in FIG. 6B has a reduced size of 5.0 mm×8.6 mm. In FIG. 6A, duplexer DPX1 comprises a pair of transmission filter TxF1 and reception filter RxF1, and duplexer DPX2 comprises a pair of transmission filter TxF2 and reception filter RxF2.

Also, as shown in FIG. 5, notch filter NF3 of communication system 1000 may be replaced by a bandpass filter BF1. Whereas notch filter NF3 has a single center frequency for a rejection band, bandpass filter BF1 may have substantially two center frequencies for two rejection bands. This allows more efficient filtering of unnecessary frequency bands upon receiving a signal with antenna ANT1.

Also, a ¼ wavelength (i.e., 90°) phase shifting unit Q may be provided between antenna ANT1 and reception filter F5. This may address a problem wherein a signal loss is great when the signal is forwarded to the filter F5 through notch filter NF1 as shown in FIG. 1. By providing the ¼ wavelength phase shifting unit Q, the quality of a signal received through filter F5 can be improved.

Although certain specific example embodiments have been described herein, they are intended to enable those skilled in the art to understand the present invention but not to limit the scope of the present invention thereto. Each of the components referred to herein may be implemented as a single component or a combination of two or more components. Each of the circuits referred to herein may be implemented as a combination of two or more components or a single integrated circuit. Those skilled in the art will also appreciate that the communication schemes referred to herein are merely exemplary and the present invention may be applied to any communication schemes which may interfere each other. Thus, the above description is not to be construed as limiting the present invention, and the scope of the invention is intended to be defined only by the following claims and the equivalents thereof.

I claim:
1. A communication system, comprising:
a first antenna;
a signal transmission and reception unit for cellular CDMA communication coupled to the first antenna;
a signal transmission and reception unit for PCS CDMA communication coupled to the first antenna;
a first device for separating signal transmission and reception coupled between the first antenna and the signal transmission and reception unit for cellular CDMA communication;
a second device for separating signal transmission and reception coupled between the first antenna and the signal transmission and reception unit for PCS CDMA communication;
a second antenna;
a signal transmission and reception unit for cellular EVDO communication coupled to the second antenna;
a signal transmission and reception unit for PCS EVDO communication coupled to the second antenna;
a third device for separating signal transmission and reception coupled between the second antenna and the signal transmission and reception unit for cellular EVDO communication;
a fourth device for separating signal transmission and reception coupled between the second antenna and the signal transmission and reception unit for PCS EVDO communication;
a signal transmission and reception unit for LTE B13 communication coupled to the second antenna; and a fifth device for separating signal transmission and reception coupled between the second antenna and the signal transmission and reception unit for LTE B13 communication, wherein at least one of the first to fifth devices for separating signal transmission and reception comprises:
first, second, and third device ports;
a circulator including a first circulator port, a second circulator port and a third circulator port, wherein an input to the first circulator port is output to the second circulator port and an input to the second circulator port is output to the third circulator port;
a transmission filter coupled between the first circulator port and the first device port; and
a reception filter coupled between the third circulator port and the third device port,
wherein the second circulator port is coupled to the second device port.

2. The communication system of claim 1, further comprising:
a third antenna for receiving a Global Positioning System (GPS) signal;
a reception circuit for intermittently receiving a LTE B13 signal coupled to the third antenna; and
a ¼ wavelength phase shifting unit coupled between the third antenna and the reception circuit for intermittently receiving a LTE B13 signal.

3. The communication system of claim 1, further comprising:
a third antenna for receiving a Global Positioning System (GPS) signal; and
a bandpass filter coupled to the third antenna.

4. A communication system, comprising:
a first antenna;
a signal transmission and reception unit configured for a first communication protocol communication conected to the first antenna;
a signal transmission and reception unit configured for a second communication protocol connected to the first antenna;
a first device configured to separate signal transmission and reception coupled between the first antenna and the signal transmission and reception unit for the first communication protocol;
a second device for separating signal transmission and reception coupled between the first antenna and the signal transmission and reception unit for the second communication protocol, wherein at least one of the first and second devices for separating signal transmission and reception comprises:
first, second, and third device ports;
a circulator comprising a first circulator port, a second circulator port and a third circulator port, wherein an input to the first circulator port is output to the second circulator port and an input to the second circulator port is output to the third circulator port;
a transmission filter coupled between the first circulator port and the first device port; and
a reception filter coupled between the third circulator port and the third device port,
wherein the second circulator port is coupled to the second device port.

5. The communication system of claim 4, Wherein the circulator further comprises:
transmission termination unit connected to the third circulator port, and comprising a phase shifting unit and a filter.

6. The communication system of claim 5, wherein the transmission termination unit further comprises a termination resistor connected to the filter.

7. The communication system of claim 4, further comprising:
a second antenna;
a signal transmission and reception unit configured for a third communication protocol connected to the second antenna;
a signal transmission and reception unit for a fourth communication protocol connected to the second antenna;
a third device for separating signal transmission and reception coupled between the second antenna and the signal transmission and reception unit for the third communication protocol;
a fourth device for separating signal transmission and reception connected between the second antenna and the signal transmission and reception unit for a fourth communication protocol;
a signal transmission and reception unit for a fifth communication protocol coupled to the second antenna; and
a fifth device for separating, signal transmission and reception coupled between the second antenna and the signal transmission and reception unit for the fifth communication protocol, at least one of the third through fifth devices for separating signal transmission and reception comprises: the first, second, and third device ports; the circulator comprising the first circulator port, the second circulator port and the third circulator port, wherein the input to the first circulator port is output to the second circulator port and the input to the second circulator port is output to the third circulator port; the transmission filter coupled between the first circulator port and the first device port; and the reception filter coupled between the third circulator port and the third device port, wherein the second circulator port is coupled to the second device port.

8. The communication system of claim 4, wherein each of the first and second devices for separating signal transmission and reception are connected to a low-pass filter and a high-pass filter, respectively.

9. The communication system of claim 8, wherein the system does not comprise either an isolator or a notch filter.

10. The communication system of claim 4, further comprising:
a third antenna for receiving a Global Positioning System (GPS) signal;
a reception circuit for intermittently receiving an input compliant with the fifth communication protocol, and coupled to the third antenna; and
a 1/4 wavelength phase shifting unit, coupled between the third antenna and the reception circuit for intermittently receiving the input compliant with the fifth communication protocol.

11. The communication system of claim 4, further comprising:
a third antenna for receiving a Global Positioning System (GPS) signal; and
a bandpass filter coupled to the third antenna.

* * * * *